April 2, 1957     A. VAN WEEL     2,787,762
DEVICE FOR MEASURING THE PHASE BETWEEN TWO VOLTAGES
Filed July 23, 1953
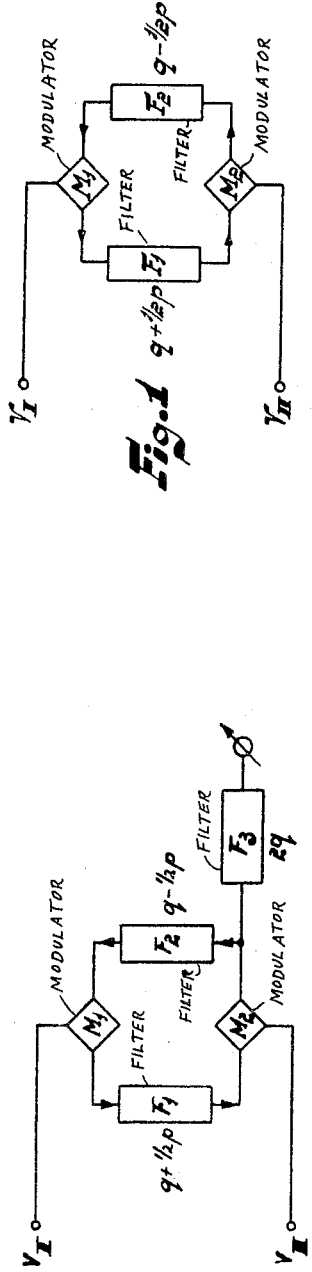
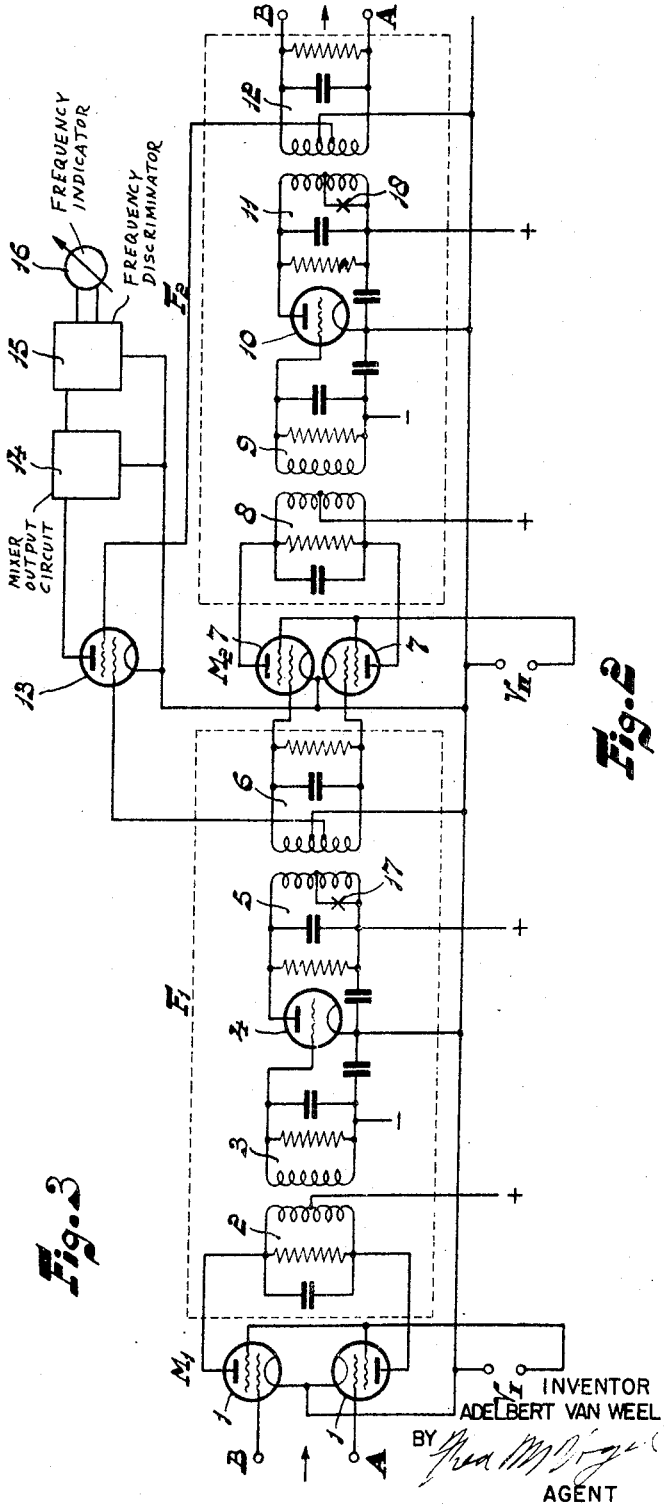
INVENTOR
ADELBERT VAN WEEL
BY
AGENT

United States Patent Office 2,787,762
Patented Apr. 2, 1957

2,787,762

DEVICE FOR MEASURING THE PHASE BETWEEN TWO VOLTAGES

Adelbert van Weel, Eindhoven, Netherlands, assignor, by mesne assignments, to North American Philips Company, Inc., a corporation of Delaware Application July 23, 1953, Serial No. 369,821

Claims priority, application Netherlands August 27, 1952

9 Claims. (Cl. 324—85)

The invention relates to a device for measuring the phase between two voltages, suitable for examining the phase characteristic curve of a network, i. e. the relationship between the phase displacement and the frequency.

It has been suggested to include a network, the phase characteristic of which is to be determined, in a closed circuit to which the alternating measuring voltage is supplied. This voltage is modulated in a modulator included in the circuit with an alternating auxiliary voltage of low frequency, which is produced in the circuit itself, since the alternating measuring voltage modulated by the alternating auxiliary voltage in the closed circuit traverses the network to be examined and is then detected, the voltage obtained, having the frequency of the alternating auxiliary voltage, being then amplified and fed to the modulator. The variation in transit time of the alternating measuring voltage in the network upon a variation in its frequency and hence also the variation in phase difference at the terminals of the network may be derived from the frequency variation of the alternating auxiliary voltage produced. This method is based on the fact that in such a loop circuit the total phase shift of the alternating auxiliary voltage to be maintained in known manner in this circuit must be zero or a whole plurality of 360°. Consequently, if in one of the elements of the loop circuit the phase shift is varied, the frequency variation of the alternating auxiliary voltage will be such that the total phase shift for the new frequency again exhibits the initial value. A variation in transit time of the alternating measuring voltage in the network becomes manifest in a variation of the phase shift of the alternating auxiliary voltage across the network. By determining the frequency of the alternating auxiliary voltage at a given value of the frequency of the alternating measuring voltage, the frequency characteristic of the network may be determined.

In this manner very small variations of the phase shift of the alternating measuring voltage across the network can be determined.

However, including the network to be examined in a loop circuit gives rise to disadvantages which become manifest if it is desired to measure a complete junction between two spots. It would therefore be of importance to be able to carry out the principle of the method described above without the need of including the network to be examined in a closed circuit. The invention has for its object to provide a solution for this problem.

According to the invention the device for measuring the phase between two voltages is characterized by a closed circuit, in which two voltages having frequencies differing from that of the first voltage are produced and which comprises in succession a first modulator in which one of the first-mentioned voltages is modulated by one of the voltages of different frequency, a filter passing only the voltages having the sum-frequency or the difference frequency of these voltages, a second modulator in which the voltage passed is modulated by the second voltage of those between which the phase is to be measured, and a second filter passing a voltage having the difference frequency or the sum frequency of the two last-mentioned voltages, the output voltage of which is fed to the first modulator, provision being furthermore made of means to measure the frequency of at least one of the voltages having different frequency.

In order that the invention may be readily carried into effect, it will now be described in detail with reference to the accompanying drawing.

Fig. 1 shows a circuit diagram which serves to illustrate the principle of the invention.

Fig. 2 shows a more complete circuit diagram of a preferred embodiment.

Fig. 3 is similar to Fig. 1 but in addition shows means for deriving the frequency to be measured from one of the modulators.

To the input terminals of the device shown in Fig. 1 are supplied two voltages $V_1$ and $V_2$ having equal frequencies $p$ but different phases. The voltage $V_1$ is modulated in the modulator $M_1$ with a voltage produced in a closed circuit, the frequency of which is assumed to be $q-\frac{1}{2}p$. Across the output circuit voltages of the sum frequency and the difference frequency occur and are fed to the filter $F_1$. This filter passes substantially only the voltage of the sum frequency, i. e. the frequency $q+\frac{1}{2}p$. Subsequent to amplification, if necessary, this voltage is supplied to the modulator $M_2$, in which it is modulated with the voltage $V_2$. The output voltage of the modulator $M_2$ is supplied to the filter $F_2$, which passes substantially only the difference frequency, i. e. the frequency $q-\frac{1}{2}p$. The voltage having this frequency is supplied, if necessary subsequent to amplification, to the modulator $M_1$ and the cycle is thus completed. The assembly constitutes an oscillator circuit, which oscillates in the frequencies $q+\frac{1}{2}p$ and $q-\frac{1}{2}p$.

When considering the path of the oscillator signal in the left-hand part of the circuit it is obvious that the phase angle in this path is determined on the one hand by the properties of the filter $F_1$ and on the other hand by the phase difference between the voltages $V_1$ and $V_2$, since in the case of conversion, the phase relations are transmitted without being varied. Thus the phase angle between the voltages $V_1$ and $V_2$ is introduced into the oscillator circuit. If this phase angle varies, also the frequencies produced vary; in the case of a small phase angle they vary linearly with the variation. In the case of greater phase angles the relationship is no longer linear.

However, it is possible to measure greater phase angles, if the filters $F_1$ and $F_2$ are constructed to be such that they are linear with frequency through a sufficiently large phase angle. This may be achieved by composing the filters from a sufficiently great number of circuits, each circuit having to produce only a small phase variation. In principle, phase measuring instruments having a range of more than 360° may thus be realized. The phase angle may, in this case, be indicated by the output voltage of a frequency discriminator. The phase angle may be read directly from the scale of an indicator.

It is of advantage to use as modulators push-pull modulators, since the initial frequencies no longer occur in the output circuits thereof.

The frequency $q+\frac{1}{2}p$ or the frequency $q-\frac{1}{2}p$ may be measured, since the variation of these two is an indication of the variation in the phase angle between the voltages $V_1$ and $V_2$. However, it is more advantageous to combine voltages having these frequencies in a mixing device and to derive a voltage having a frequency $2q$. This has the advantage that an occasional variation of the frequency $p$ does not affect the measuring result.

In the circuit diagram shown in Fig. 2 the first mixing stage comprises two push-pull connected tubes 1. The voltage $V_1$ is supplied to the outer grids and the voltage having the frequency $q-\frac{1}{2}p$ to the inner grids of these tubes. The voltages having the sum frequency and the difference frequency are supplied to a filter comprising two inductively coupled circuits 2 and 3. The damping of these circuits is enhanced by means of parallel resistors. This filter passes the frequency $q+\frac{1}{2}p$. The amplification is provided by a tube 4, the output circuit of which includes a second filter comprising two inductively coupled circuits 5 and 6. This filter, the circuits of which are also damped, serves also for limitation. For this purpose a resistor having a negative temperature coefficient may be connected in parallel with part of the inductance of the circuit 5.

The circuit 6 is connected between the first grids of two push-pull connected tubes 7, forming part of the second modulator $M_2$. The second voltage $V_2$ is operative between the interconnected second grids of these tubes and earth. The modulator $M_2$ is followed by a filter comprising two circuits 8 and 9, an amplifier 10 and a filter comprising two circuits 11 and 12. The circuit 12 is connected between the inner grids of the modulator $M_1$, so that the cycle is completed. The filter comprising an amplifier next to and following the modulator $M_2$ may be identical with the filter comprising an amplifier and following the modulator $M_1$, but the former is tuned to the frequency $q-\frac{1}{2}p$. The frequencies $q+\frac{1}{2}p$ and $q-\frac{1}{2}p$ are produced spontaneously in the circuit, the value $q$ varying with the phase difference between the voltages $V_1$ and $V_2$. This value may be measured as a frequency by combining voltages having the first-mentioned frequencies in a manner such that voltages having the sum frequency thereof are produced. This is carried out in the circuit arrangement shown in a mixing tube 13, the first grid of which is connected to a point of the circuit 6 and the second grid to a point of the circuit 12. The voltages having the frequency $2q$ occur in the device 14. This device is connected to a frequency discriminator 15, the output current of which, being an indication of the frequency $2q$, is measured by means of the instrument 16.

As an alternative, one of the modulators may have directly derived from it a voltage having a frequency equal to the sum frequency of the oscillations passing through the filters.

If at least in the development of progression of the output current to the input voltage also comprises third-power members, not only oscillations having a frequency $q+\frac{1}{2}p$ but also oscillations which may be assumed to be produced by oscillations having the frequency $2(q-\frac{1}{2}p)$ and oscillations having the frequency $p$ occur across the output circuit of the first modulator. Consequently oscillations having the sum frequency $2q$ are obtained in the output circuit of the first modulator. In the same manner oscillations having a frequency equal to the difference between the frequencies $2(q+\frac{1}{2}p)$ and $p$ and hence having the frequency $2q$ occur in the output circuit of the second modulator.

The frequency to be measured may be derived from the output circuit of one of the modulators by using a filter passing the sum of the frequencies passing through the first-mentioned filters and by connecting this filter between the output circuit of one of the first modulators and the instrument for measuring the frequency.

Fig. 3 shows diagrammatically such a circuit arrangement. The voltages between which the phase is to be measured are supplied at $V_I$ and $V_{II}$ to the closed network, comprising two modulators $M_1$ and $M_2$ and the filters $F_1$ and $F_2$, combined, if desired, with amplifiers. Oscillations having frequencies $q+\frac{1}{2}p$ and $q-\frac{1}{2}p$ are maintained in the closed circuit.

A third filter $F_3$ passes the frequency $2q$. It is connected between the output circuit of one of the modulators and the measuring instrument.

What is claimed is:

1. A device for measuring the phase displacement between two given voltages in a closed circuit which produces two circuit voltages having frequencies differing from said two given voltages comprising a first modulator, means for applying the first of said two given voltages to the input of said modulator to mix therein with the first of said two circuit voltages, a first filter coupled to the output of said modulator for extracting therefrom the second of said two circuit voltages constituted by the sum frequency of said first given voltage and said first circuit voltage, a second modulator, means for applying said second circuit voltage to the input of said second modulataor, means for also applying the second of said two given voltages to the input of said second modulator, a second filter coupled to the output of said second modulator for extracting therefrom said first circuit voltage constituted by the difference frequency of said second given voltage and said second circuit voltage, said second filter being connected to the input of said first modulator to feed said first circuit voltage thereto, and means coupled to said closed circuit to measure the frequency of at least one of said circuit voltages.

2. A device, as set forth in claim 1, wherein said closed circuit further includes at least one amplifier coupled to one of said filters.

3. A device, as set forth in claim 1, wherein said closed circuit further includes at least one linear amplitude limiter coupled to one of said filters.

4. A device, as set forth in claim 1, wherein said filters are phase linear filters.

5. A device, as set forth in claim 1, wherein said modulators are push-pull modulators.

6. A device, as set forth in claim 1, wherein the frequency measured is the frequency of a voltage constituted by the algebraic sum frequency of said two circuit voltages.

7. A device for measuring the phase displacement between two given voltages in a closed circuit which produces two circuit voltages having frequencies differing from said two given voltages comprising a first modulator, means for applying the first of said two given voltages to the input of said modulator to mix therein with the first of said two circuit voltages, a first filter coupled to the output of said modulator for extracting therefrom the second of said two circuit voltages constituted by the sum frequency of said first given voltage and said first circuit voltage, a second modulator, means for applying the second circuit voltage to the input of said second modulator, means for also applying the second of said two given voltages to the input of said second modulator, a second filter coupled to the output of said second modulator for extracting therefrom said first circuit voltage constituted by the difference frequency of said second given voltage and said second circuit voltage, said second filter being connected to the input of said first modulator to feed said first circuit voltage thereto, and a frequency meter connected to the output of one of said modulators to measure the sum frequency of the voltages extracted by said filters.

8. A device, as set forth in claim 7, further including a third filter interposed between the output of said one modulator and said frequency meter for extracting from said one modulator said sum frequency of the voltages extracted by said first and second filters.

9. A device for measuring the phase difference between two given voltages in a closed circuit which produces two circuit voltages having frequencies differing from said two given voltages comprising a first electron discharge device, a second electron discharge device, each of said discharge devices having a cathode, a first control grid, a second control grid and an anode, means for applying the first of said two given voltages to said second control grids, a first coil having a tap thereon interposed between said anodes, a first resistor connected across said coil, a first capacitor connected across said resistor, means for applying a positive potential to said tap, a second coil inductively coupled with said first coil, a second resistor connected across said second coil, a second capacitor connected across said second resistor, a third electron discharge device having a cathode, an anode and a control electrode connected to one of the two junctions of said second coil and said second resistor, means for coupling the other junction to the cathode of said third discharge device, means for applying a negative bias to said control electrode, a third coil having a second tap thereon, a third capacitor connected across said third coil, a third resistor connected across said third capacitor, a first limiting resistor having a negative temperature coefficient interposed between said second tap and one of the two junctions of said third coil and said third capacitor, the other of said third coil-third capacitor junctions being connected to the anode of said third discharge device, means for coupling said one third coil-third capacitor junction to the cathode of said third discharge device, means for applying a positive potential to the anode of said third discharge device, a fourth coil having a third tap and a fourth tap thereon coupled inductively to said third coil, a fourth capacitor connected across said fourth coil, a fourth resistor connected across said fourth capacitor, a fourth electron discharge device, a fifth electron discharge device, each of said fourth and fifth discharge devices having a first control grid, a second control grid, an anode and a cathode, said fourth resistor being connected between the first control grids of said fourth and fifth discharge devices means for applying the second of said two given voltages to the second control grids of said fourth and fifth discharge devices, a fifth capacitor interconnecting the anodes of said fourth and fifth discharge devices, a fifth resistor connected across said fifth capacitor, a fifth coil having a fifth tap thereon connected across said fifth resistor, means for applying a positive potential to said fifth tap, a sixth coil inductively coupled with said fifth coil, a sixth resistor connected across said sixth coil, a sixth capacitor connected across said sixth resistor, a sixth electron discharge device having a cathode, an anode and a control electrode connected to one of the two junctions of said sixth coil and said sixth resistor, means for coupling the other of said sixth coil-sixth resistor junctions to the cathode of said sixth discharge device, means for applying a negative bias to the control electrode of said sixth discharge device, a seventh coil having a sixth tap thereon, a seventh capacitor connected across said seventh coil, a seventh resistor connected across said seventh capacitor, a second limiting-resistor having a negative temperature coefficient interposed between said sixth tap and one of the two junctions of said seventh coil and said seventh capacitor, the other of said seventh coil-seventh capacitor junctions being connected to the anode of said sixth discharge device, means for coupling said one seventh coil-seventh capacitor junction to the cathode of said sixth discharge device, means for applying a positive potential to the anode of said sixth discharge device, an eighth coil having a seventh tap and an eighth tap thereon coupled inductively to said seventh coil, an eighth capacitor connected across said eighth coil, an eighth resistor connected across said eighth capacitor, said eighth resistor being connected between the first control grids of said first and second discharge devices, a mixing tube having a cathode, a first control electrode, a second control electrode and a plate, means for coupling said first control electrode to said fourth tap, means for connecting said second control electrode to said eighth tap, means for coupling said third and said seventh taps to said cathodes, an output device coupled to said plate, a frequency discriminator, and a frequency meter coupled through said frequency discriminator and said output device to the plate of said mixing tube.

No references cited.